United States Patent
Harasaki et al.

(10) Patent No.: US 6,590,908 B1
(45) Date of Patent: Jul. 8, 2003

(54) EXTERNAL SIGNAL SYNCHRONIZED MESSAGE SIGNALING APPARATUS FOR TIME DIVISION CHANNEL SYSTEM

(75) Inventors: Kazuhiko Harasaki, Tokyo (JP); Hideyuki Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/394,876

(22) Filed: Sep. 13, 1999

(30) Foreign Application Priority Data

Sep. 11, 1998 (JP) .......................................... 10-258891

(51) Int. Cl.$^7$ ................................................. H04J 3/06
(52) U.S. Cl. ........................ 370/508; 370/510; 370/512
(58) Field of Search ................................. 370/357, 358, 370/360, 361, 363, 366, 371, 372, 376, 377, 378, 379, 381, 382, 510, 509, 511, 512, 513, 516, 518, 528, 508

(56) References Cited

U.S. PATENT DOCUMENTS

| 4,581,732 A | 4/1986 | Boisseau et al. |
| 5,649,102 A | 7/1997 | Yamauchi et al. |

FOREIGN PATENT DOCUMENTS

| JP | 61-159857 | 7/1986 |
| JP | 4-290095 | 10/1992 |
| JP | 5-175950 | 7/1993 |

*Primary Examiner*—Chau Nguyen
*Assistant Examiner*—Soon-Dong Hyun
(74) *Attorney, Agent, or Firm*—Foley & Lardner (57) ABSTRACT

An external signal synchronized message signaling apparatus which outputs a particular message to channels of a time division output frame in accordance with a state of an external signal is disclosed. The message signaling apparatus includes a switch buffer, a selector, a message memory, a read control memory and a read controller. Addresses common to the switch buffer and the message memory are stored in the read control memory, and the read controller reads out one of the addresses from the read control memory, reads out data from the switch buffer or the message memory based on the read out address and outputs the read out data to a time division frame. Synchronization instruction information is set individually for the individual data in the read control memory or the message memory, and only when an external synchronizing signal is present when data to be signaled for an individual channel us to be read out, the address read out by the read controller is used as an address for the message memory.

10 Claims, 8 Drawing Sheets

◆ SWITCH BUFFER 1

| | |
|---|---|
| FOR INPUT CHANNEL 0 | INPUT CHANNEL 0 |
| FOR INPUT CHANNEL 1 | INPUT CHANNEL 1 |
| ⋮ | ⋮ |
| FOR INPUT CHANNEL n | INPUT CHANNEL N |

FIG. 1C

◆ MESSAGE MEMORY 2

| | | |
|---|---|---|
| MESSAGE0 | BYTE0 | 0 |
| MESSAGE0 | BYTE1 | 0 |
| | | |
| MESSAGE0 | BYTEk | 1 |
| MESSAGE1 | BYTE0 | 0 |
| ⋮ | | |
| MESSAGEi | BYTEj | 1 |

↑ E FLAG SETTING AREA

FIG. 1D

◆ READ CONTROL MEMORY 4

| | | | | |
|---|---|---|---|---|
| FOR SIGNALING CHANNEL 0 | ADDRESS DESIGNATION VALUE | s | \| | SYNC |
| FOR SIGNALING CHANNEL 1 | ADDRESS DESIGNATION VALUE | s | \| | SYNC |
| ⋮ | ⋮ | | | |
| FOR SIGNALING CHANNEL n | ADDRESS DESIGNATION VALUE | s | \| | SYNC |

◆ SWITCH BUFFER 1

| | |
|---|---|
| FOR INPUT CHANNEL 0 | INPUT CHANNEL 0 |
| FOR INPUT CHANNEL 1 | INPUT CHANNEL 1 |
| ⋮ | ⋮ |
| FOR INPUT CHANNEL n | INPUT CHANNEL N |

FIG. 3C

◆ MESSAGE MEMORY 8

| | | | |
|---|---|---|---|
| MESSAGE0 | BYTE0 | 0 | SYNC |
| MESSAGE0 | BYTE1 | 0 | SYNC |
| ⋮ | | | |
| MESSAGE0 | BYTEk | 1 | SYNC |
| MESSAGE1 | BYTE0 | 0 | SYNC |
| ⋮ | | | |
| MESSAGEi | BYTEj | 1 | SYNC |

↑
E FLAG SETTING AREA

FIG. 3D

◆ READ CONTROL MEMORY 7

| | | | |
|---|---|---|---|
| FOR SIGNALING CHANNEL 0 | ADDRESS DESIGNATION VALUE | s | I |
| FOR SIGNALING CHANNEL 1 | ADDRESS DESIGNATION VALUE | s | I |
| ⋮ | ⋮ | | |
| FOR SIGNALING CHANNEL n | ADDRESS DESIGNATION VALUE | s | I |

FIG. 4

EXTERNAL SIGNAL SYNCHRONIZED MESSAGE SIGNALING APPARATUS FOR TIME DIVISION CHANNEL SYSTEM

BACKGROUND OF THE INVENTION

1. Field of the Invention

The present invention relates to a time division multiplex communication system, and more particularly to an external signal synchronized message signaling apparatus for a time division channel system which can insert a particular message into predetermined channels and transmit it in synchronism with a timing of an external signal.

2. Description of the Related Art

A system is conventionally known wherein a particular message is inserted into particular channels of time division multiplex communication and transmitted in synchronism with an external signal such as a timing control signal. In the system mentioned, an external signal is detected by software or firmware, and a change of the external signal is detected and an instruction to signal a message is issued in response to the detected change.

With the message signaling system described above, however, because the software or firmware has a limitation in processing capability, a long time is required to detect a change of the external signal or issue a message signaling instruction, and consequently, so much time is required after the external signal changes until a message is actually signaled that the message cannot sometimes be signaled at a required timing.

SUMMARY OF THE INVENTION

It is an object of the present invention to provide an external signal synchronized message signaling apparatus for a time division channel system by which a message can be signaled in synchronism with a signaling instruction signal from the outside.

It is another object of the present invention to provide an external signal synchronized message signaling apparatus for a time division channel system by which an arbitrary message signal can be signaled in synchronism with a signaling instruction signal from the outside for each of a plurality of channels of time division timings.

It is a further object of the present invention to provide an external signal synchronized message signaling apparatus for a time division channel system by which data of an arbitrary byte length can be signaled in synchronism with a signaling instruction signal from the outside.

In order to attain the objects described above, according to an aspect of the present invention, there is provided an external signal synchronized message signaling apparatus which inserts a message into predetermined channels to form a time division frame and transmits the time division frame in synchronism with an external signal, comprising a message memory having the message stored at predetermined addresses thereof, a read control memory in which information of the addresses of the message memory at which the message is stored and external synchronization information indicative of whether the message should be signaled in synchronism with the external signal are stored in a coordinated relationship at storage positions thereof which corresponds to predetermined channel timings of a time division output frame, and a read controller for reading out, for each channel timing of the time division output frame, the address information and the external synchronization information at the corresponding storage position from the read control memory and, when the external signal is inputted at the channel timing and the external synchronization information indicates synchronized signaling, reading out the message from the message memory based on the address information and signaling the message to the time division output frame.

According to another aspect of the present invention, there is provided an external signal synchronized message signaling apparatus which inserts a message into predetermined channels to form a time division frame and transmits the time division frame in synchronism with an external signal, comprising a message memory in which the message and external synchronization information indicative of whether or not the message should be signaled in synchronism with the external signal are stored in a coordinated relationship at predetermined addresses thereof, a read control memory in which information of the addresses of the message of the message memory is stored at storage positions thereof which corresponds to predetermined channel timings of a time division output frame, and a read controller for reading out, for each of the channel timings of the time division output frame, the address information from the storage position of the read control memory corresponding to the channel timing and reading out the message and the external synchronization information from the message memory based on the address information, and signaling, when the external synchronization information indicates synchronized signaling, the message to the time division output frame.

Each of the external signal synchronized message signaling apparatus may be constructed such that the read control memory has stored therein corresponding to the information of each of the stored addresses idle information indicating whether or not an idle pattern should be outputted to the time division output frame, and the read control refers, when to read out the information of the address, to the idle information and signals, when the idle information indicates signaling of an idle pattern, a predetermined idle pattern to the time division output frame.

Each of the external signal synchronized message signaling apparatus may be constructed such that it further comprises a switch buffer memory having channel data of individual channels of a time division input frame and operable to read out the channel data and signal the channel data to the time division output frame, and the read control memory has stored therein corresponding to the information of each of the addresses channel information indicative of whether the channel data should be outputted to the time division output frame using the stored address information also as read address information for the switch buffer, and the read controller refers, upon reading of the information of the address, to the channel information, reads out, when the channel information indicates signaling of the channel data, the channel data from the switch buffer memory based on the read out address information and signals the read out channel data to the time division output frame.

Further, each of the external signal synchronized message signaling apparatus may be constructed such that the message data is divided in a plurality of data corresponding to different channels and stored at consecutive addresses of the message memory while information of the address of the top one of the divisional data is initially set as the address information in the read control memory, and the read controller successively outputs the divisional data beginning with the top data to the time division output frame at the individual channel timings and overwrites, each time the data is outputted, the address information of the read control memory based on the successive address.

According to a further aspect of the present invention, there is provided an external signal synchronized message signaling apparatus which inserts a message into predetermined channels to form a time division frame and transmits the time division frame in synchronism with an external signal, comprising a switch buffer for receiving a time division input frame as an input thereto and outputting a time division output frame in a sequential write-random read manner, a message memory for outputting a message to a time division output frame, a read control memory in which addresses for reading out data of the switch buffer and the message memory and outputting the data to channels of the time division output frame are stored, the addresses being used commonly for the switch buffer and the message memory, designation information which designates from which one of the switch buffer and the message memory data should be read out so as to be signaled into the time division output frame being stored in the read control memory or the message memory in a coordinated relationship to each of the addresses, and a read controller for referring, when data to be signaled to a channel of the time division output frame is to be outputted based on one of the addresses of the read control memory, to the designation information to read out the data of the switch buffer or the message memory and signaling the data in response to an external signal.

The read controller may calculate, each time data is read out, a next read address and overwrite the address of the timing of the channel of the read control memory with the calculated next read address.

With each of the external signal synchronized message signaling apparatus, a message can be signaled in synchronism with an external signal. Further, since synchronization can be designated for each channel, the same message can be handled in different signaling manners among a plurality of channels. Furthermore, since synchronization designation is performed for each of different messages, synchronization designation can be performed based on a significance of each message itself. In addition, since synchronization designation need not be recognized upon setting of individual channels, simplification of signaling control is facilitated.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1A:
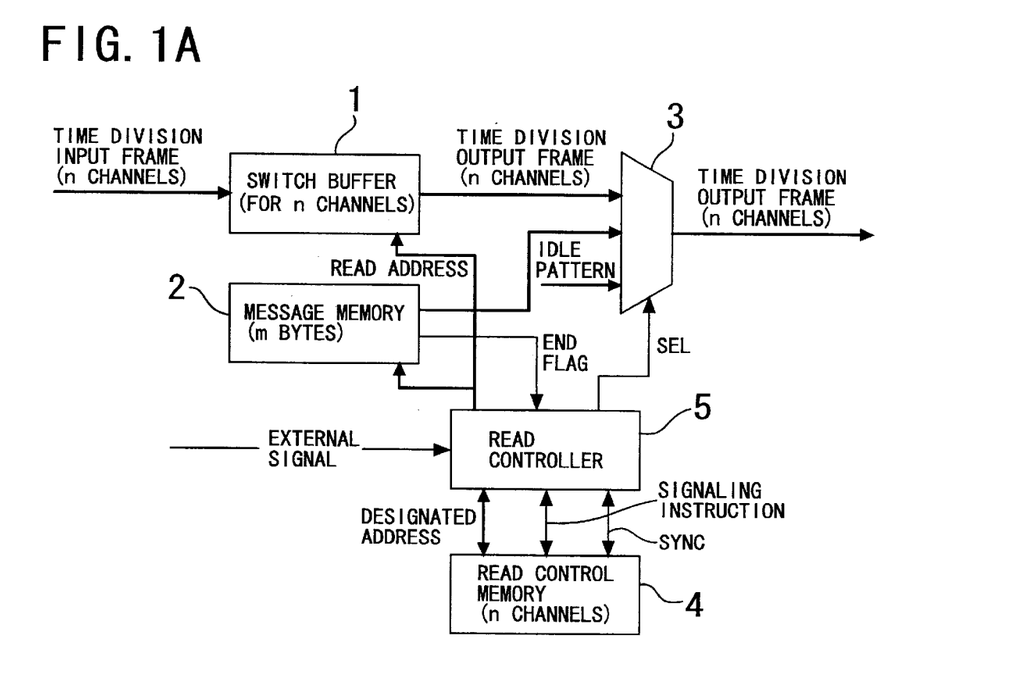
FIG. 1A is a block diagram showing an external signal synchronized message signaling apparatus for a time division channel system to which the present invention is applied.

Referring first to FIG. 1A, there is shown an external signal synchronized message signaling apparatus for a time division channel system to which the present invention is applied. The external signal synchronized message signaling apparatus for a time division channel system includes a switch buffer 1 for receiving a time division input frame as an input thereto and outputting a time division output frame, a message memory 2 in which a message to be inserted into predetermined channels is stored, a selector 3 for selecting one of outputs of the switch buffer 1 and the message memory 2 and an idle pattern to produce a time division output frame and outputting the time division output frame, a read control memory 4 for storing a read address to be used commonly for both of the switch buffer 1 and the message memory 2, and a read controller 5 for reading out stored contents of the read control memory 4 and controlling reading out of the switch buffer 1 or the message memory 2 and switching of the selector 3.

Figure 1B:
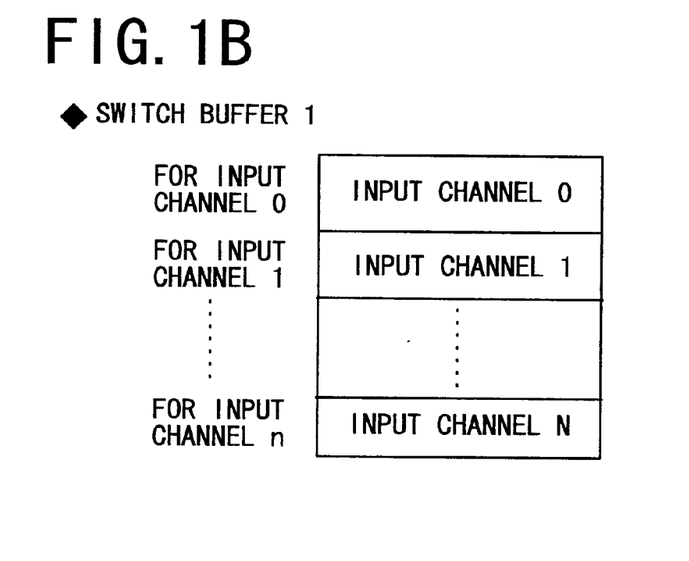
FIGS. 1B, 1C and 1D are diagrammatic views illustrating stored contents of a switch buffer, a message memory and a read control memory shown in FIG. 1A.

The switch buffer 1 is formed as a buffer circuit for multiple channel data constructed such that a time division input frame inputted thereto is demultiplexed into data of different channels and stored in order of the channels as input channels 0 to N as seen in FIG. 1B, and the stored data of the channels are read out in order of the time into the channels of a time division output frame of the transmission side under the control of the read controller 5. Time division switching operation for the stored data of the switch buffer 1 is performed by arbitrarily designating addresses of the switch buffer 1 into setting areas of the read control memory 4 for the individual signaling channels. In short, the switch buffer 1 can effect a switching operation of an input time division frame sequential write-random read type wherein, upon inputting, data of a time division frame are successively written into the switch buffer 1 for the individual channels, and upon reading, the data are read out at arbitrary timings and inserted into arbitrary output channels.

Figure 1C:
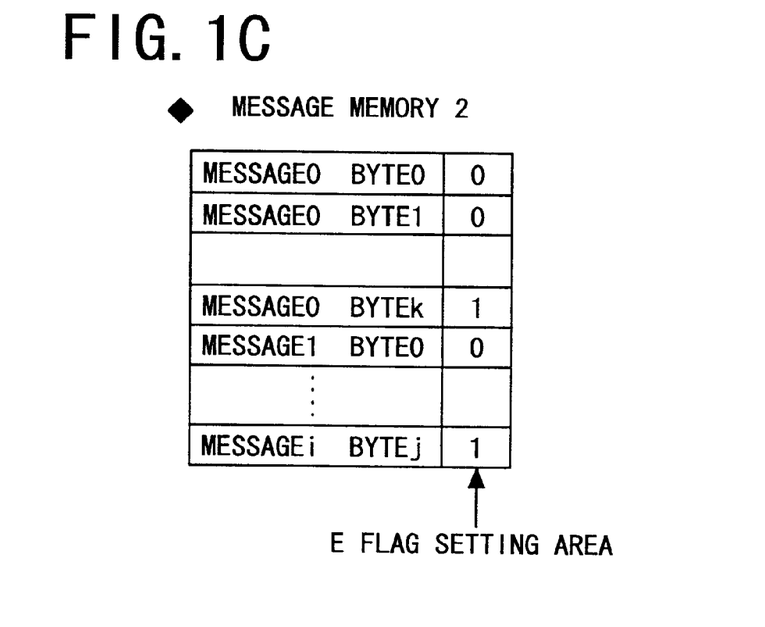

The message memory 2 can set and store messages of arbitrary byte length data to be signaled into predetermined output channels. In particular, each message is delimited into data of, for example, a unit of 1 byte and successively stored into consecutive addresses. Since messages are divisionally stored in the message memory 2, each data has an END flag (E flag) area, and as seen in FIG. 1C, where the data is an intermediate data, a signaling instruction flag "0" representing that data should be signaled continuously is set to the E flag, but where the data is the last data, a signaling ending flag "1" is set to the E flag. Therefore, the message memory 2 includes a data area and an E flag area, and message data are stored in successive addresses of the data area beginning with an arbitrary top address, and the flag "1" is placed in the E flag area at the last address of the message data in order to indicate that reading should be ended.

Figure 1D:
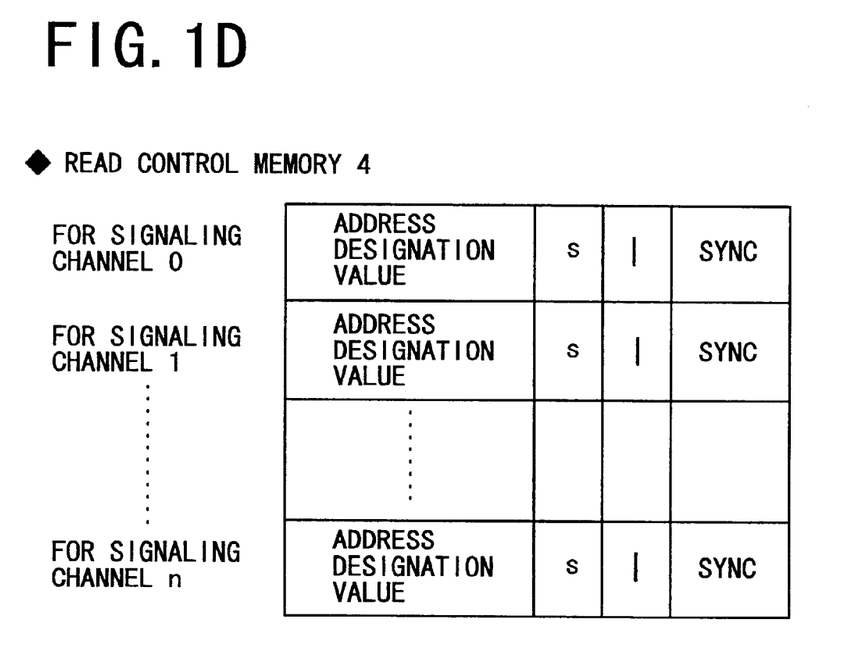

The read control memory 4 has set therein S bit, I bit and SYNC bit in addition to address designation values for the switch buffer 1 and the message memory 2 as seen in FIG. 1D. Each of the address designation values set to the read control memory 4 is a reading address for the switch buffer 1 and is the top address of a sequence of message data (a message delimited by an END flag) stored in the read control memory 4. The top address is coordinated for each individual channel if necessary.

The S bit is a bit which designates whether the corresponding address designation value represents an address of the switch buffer 1 or an address of the message memory 2. When the S bit is "1" or "0", the address designation value is used as an address designation value of the switch buffer 1 or an address designation value of the message memory 2.

The I bit is a bit which indicates signaling of an idle pattern. When the S bit is "0", which indicates that reading out of the switch buffer 1 should be performed, and the I bit is "1", the idle pattern is signaled into an output channel.

The SYNC bit is a bit of external synchronization information which determines whether the external signal synchronized message signaling apparatus should operate so that a message of an address designation value of the message memory 2 may be signaled into an output channel synchronously in response to an external signal which is a signal for instructing signaling or should operate so that the message may be signaled automatically in accordance with a designation of the S bit.

The selector 3 is a switch for selecting one of data read out from the switch buffer 1, data read out from the message memory 2 and the idle pattern as data to be signaled into an output channel.

The read controller 5 reads out an address designation value from the read control memory 4 and performs control of reading out data from the switch buffer 1 or the message memory 2. Further, upon reading out of an address designation value, the read controller 5 reads the S bit, I bit and SYNC bit, and, when the address designation value designates reading out of the message memory 2, checks the SYNC bit to determine whether an operation synchronized with an external signal should be performed or not.

Upon reading out of the message memory 2, the read controller 5 reads out individual data (for example, 1-byte data) of a message for individual channels, supervises a corresponding E flag and recognizes, if it detects the END flag "1", ending of the reading out.

Further, the read controller 5 performs, in addition to the reading out control of the switch buffer 1 or the message memory 2 with an address designation value, control to insert the idle pattern into a predetermined channel. In order to multiplex read signals from the switch buffer 1 and the message memory 2 and the idle patterns to form a time division multiplex frame, the read controller 5 outputs a control signal SEL to the selector 3 to control switching of the selector 3. Accessing to the read control memory 4 is performed time divisionally in accordance with time division timings of the channels of the time division output frame. The control of the read controller 5 to read out data of the channels from the switch buffer 1 and signal the data into the channels is performed based on setting of address designation values of the switch buffer 1 to setting regions of the individual signaling channels of the read control memory 4. Reading out of the sequential write-random read system wherein data of the channels from a time division input frame are written sequentially and data of the channels for a time division output frame are read at random with address designation values of the read control memory 4 can be performed as described hereinabove.

In order to read out message data from the message memory 2 and insert it into a particular channel, the read controller 5 detects and determines, upon accessing to the read control memory 4, the S bit of a signaling instruction flag, and reads out an address designation value indicating a top address of the read control memory 4. Then, the read controller 5 reads out data from the message memory 2 beginning with a corresponding address designation value and successively signals the message data of a predetermined unit (1 byte) into predetermined output channels.

After the message data are signaled, an address designation value obtained by adding 1 to the address designation value read out from the read control memory 4 formerly is overwritten into the same address setting location of the read control memory 4. The operation described is repeated M times for each time division cycle, and the address designation value of the message memory 2 is successively shifted up. Then, if message data of the address designation value to which the E flag is applied is read out and signaled, then the read controller 5 sets the flag of the read control memory 4 to "0" (end of signaling) to stop the signaling of the continuous message. This sequence of operations is performed for each of the individual output channels.

Here, since a message can be delimited with an arbitrary length, an arbitrary number of messages of arbitrary lengths can be set in accordance with the capacity of the message memory 2. Further, a message can be signaled over a plurality of output channels at output timings of the individual channels.

Since the message memory 2 is handled in parallel to the switch buffer 1 and the read control memory 4 is used as an output control memory for the switch buffer 1 in this manner, the message signaling apparatus can be incorporated into an arbitrary type of time division switch and allows signaling of a message of an arbitrary order using a function of the time division switch as it is. In this instance, the signaling instruction flag of the read control memory 4 is used as a bit for switching between the switch buffer/message memory.

Whether data from the switch buffer 1 should be read out or data from the message memory 2 should be read out depends upon the S bit which is set to the address designation value of the read control memory 4 to be read out. Where the S bit is set, the address designation value is re-read as a read address designation value of the message memory 2 and read data from the message memory 2 is outputted, but if the S bit is not set, then the address designation value is re-read as a read address designation value of the switch buffer 1 and read data from the switch buffer 1 is outputted. On the other hand, if the S bit is set while the I bit is set, then the idle pattern is signaled into a signaling channel, but if the S bit is not set, priority is given to the setting of the S bit and a message is signaled.

Further, the read controller 5 supervises the E flag of read data of the message memory 2 when the S bit is set. Upon reading out of data from an address when the E flag is not set, the address designation value of the read controller 5 is overwritten with a value obtained by adding 1 to it, but upon reading out of data from an address when the E bit is set, an invalid setting value is overwritten into the S bit.

In the message signaling apparatus of the present embodiment, transmission of a message in synchronism with an external signal can be realized. In order to allow instruction of synchronization in unit of a signaling channel, the SYNC bit (synchronization bit) is provided in the read control memory 4, and the SYNC bit is set for each of the signaling channels together with a signaling instruction flag (signaling or ending).

For each channel for which the SYNC bit is set, the signaling instruction flag (signaling or ending) is kept from being rendered operative before the external signal becomes active to allow transmission of a message in synchronism with the external signal. Since it can be designated for each of the channels whether or not a message should be signaled in synchronism with an external signal, the same message can be handled in different signaling manners among a plurality of different channels.

Operation of the message signaling apparatus described above is described below. In the message signaling apparatus, data of the input channels 0 to N are stored in order of time and in order of the input channels into the switch buffer 1.

The message memory 2 has a plurality of messages message 0, message 1, . . . , message j of arbitrary lengths stored individually as 1-byte data of byte0 to bytek, byte0 to . . . , . . . to bytej at successive addresses thereof as seen in FIG. 1C. In the E flag setting area, "1" is set to the last byte data of each of the messages, and "0" is set to any other byte data than the last byte data. Here, the address of top byte data of each message is set so as to coincide with the address of a signaling channel.

Then, read address designation values of the switch buffer 1 are stored for individual signaling channels into the read control memory 4. Here, the address designation value of each signaling channel is set so as to be coincident with the address of predetermined top byte data of the message memory 2 in which a message to be signaled over the channel is stored. "1" is placed into the S bit which corresponds to the address designation value for each of channels over which a message can be signaled. Further, when data is to be read out from the switch buffer 1 into a channel of an address designation value and inserted into an output channel, "0" is placed into the I bit which corresponds to the address designation value. Further, where the idle pattern Idle is to be inserted into the output channel, "1" is placed into the I bit.

In order to allow controlling of an operation of reading out and outputting of a stored message of the message memory with an external synchronizing signal, the SYNC bit corresponding to the address designation value of the channel is set to "1".

Figure 2:
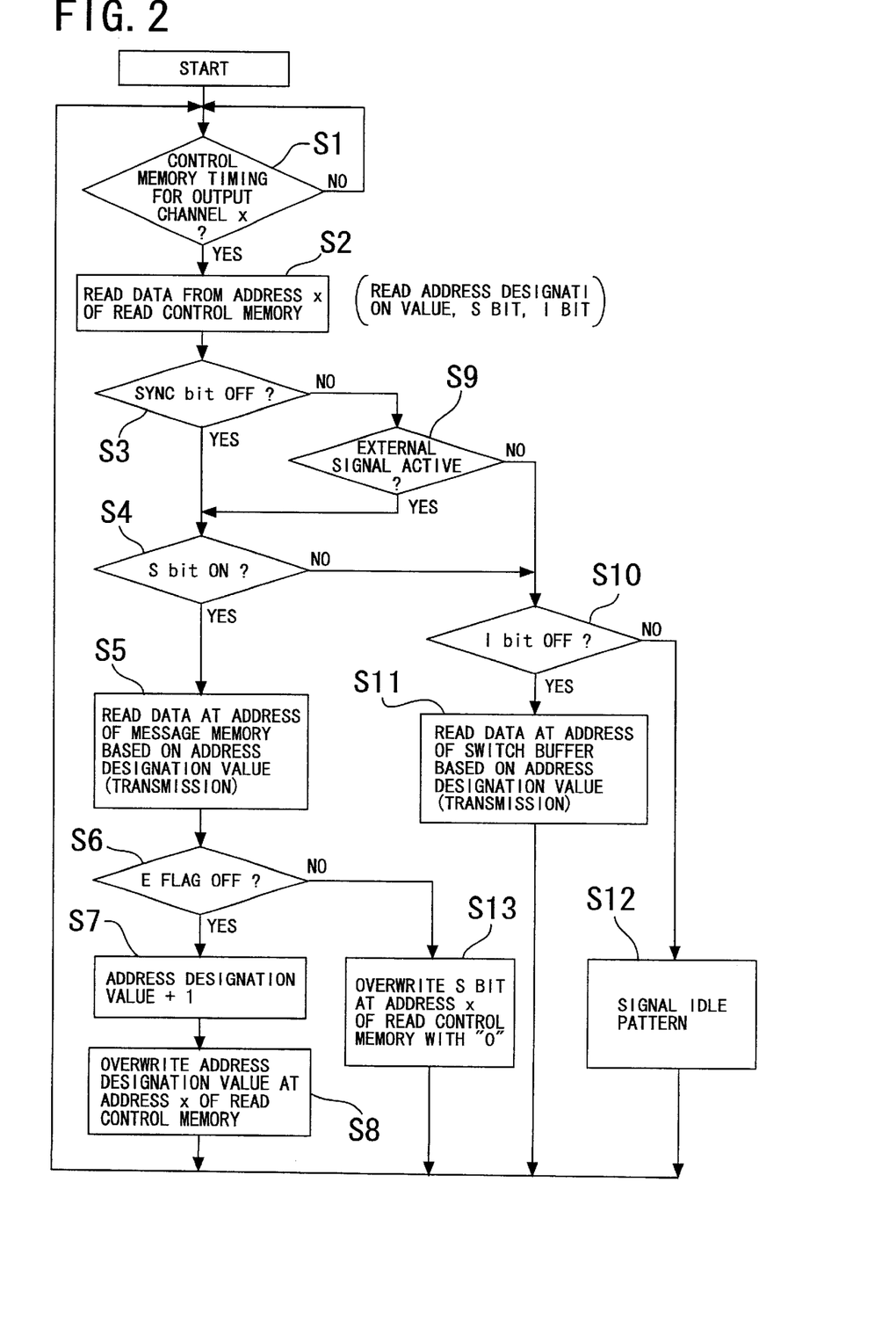
FIG. 2 is a flow chart illustrating operation of the external signal synchronized message signaling apparatus for a time division channel system shown in FIG. 1A.

Operation of the message signaling apparatus is described below with reference to FIG. 2.

If the read controller 5 which monitors the state of, for example, a channel counter which defines a timing of an output channel detects the timing of an output channel x (step S1), then the read controller 5 reads out the address designation value, S bit and I bit at the address x of the read control memory 4 (step S2). Then, the read controller 5 reads the synchronization bit (SYNC bit) at the address x and checks an external signal when the SYNC BIT is "1" (no in step S3). If the external signal is active (yes in step S9), then the read controller 5 checks the S bit (step S4). If the S bit is "1" (yes in step S4), then the read controller 5 reads out message data and the E flag from the message memory 2 based on the address designation value read out from the read control memory 4 (step S5). If the E flag is "0" (yes in step S6), then since the message data is not the last data, the read controller 5 increments the address designation value by 1 (step S7) and overwrites the address designation value at the address x with the incremented address designation value (step S8). This is performed in order to make it possible, when the read controller 5 detects a timing of the output channel x subsequently, to read out a next address designation value from the read control memory 4 and read out next message data of the same message from the message memory 2 (steps S1 to S3, S9 and S4 to S5).

While similar operation is repeated for each of the output channels x to continue signaling of message data, if "1" is detected from the E flag (no in step S6), then the S bit at the address x of the read control memory 4 is overwritten with "0" in order to end the signaling of a message and subsequently perform processing of reading out of the switch buffer 1 or signaling of the idle pattern (step S13).

If the S bit at the timing of the output channel x in step S2 is "0", then the steps S4 to S9 and S13 are not performed. When the external signal is inactive in step S9 or when the S bit is "0" even if the external signal is active (no in step S4), the read controller 5 checks the I bit (step S10). If the I bit is "0" (yes in step S10), the read controller 5 reads out data at the address of the switch buffer 1 (step S11). If the I bit is "1" (no in step S10), then the read controller 5 outputs the idle pattern.

Further, if the SYNC bit is "0" in step S3 in which the SYNC bit is checked, then operation of the external synchronization mode is not performed, but the control advances directly to step S4 for inspection of the S bit.

The operation described above is performed also at a timing of any other output timing. Since an address designation value which is a top address of a message to be signaled is stored in each signaling channel of the read control memory 4, reading out of message data is shared by the output channels, and message data or channel data are read out suitably from the message memory 2 and the switch buffer 1 and the data thus read out and the idle patterns are switchably multiplexed in the signaling channels by the selector 3 to form a time division output frame. The thus formed time division output frame is outputted.

Figure 3A:
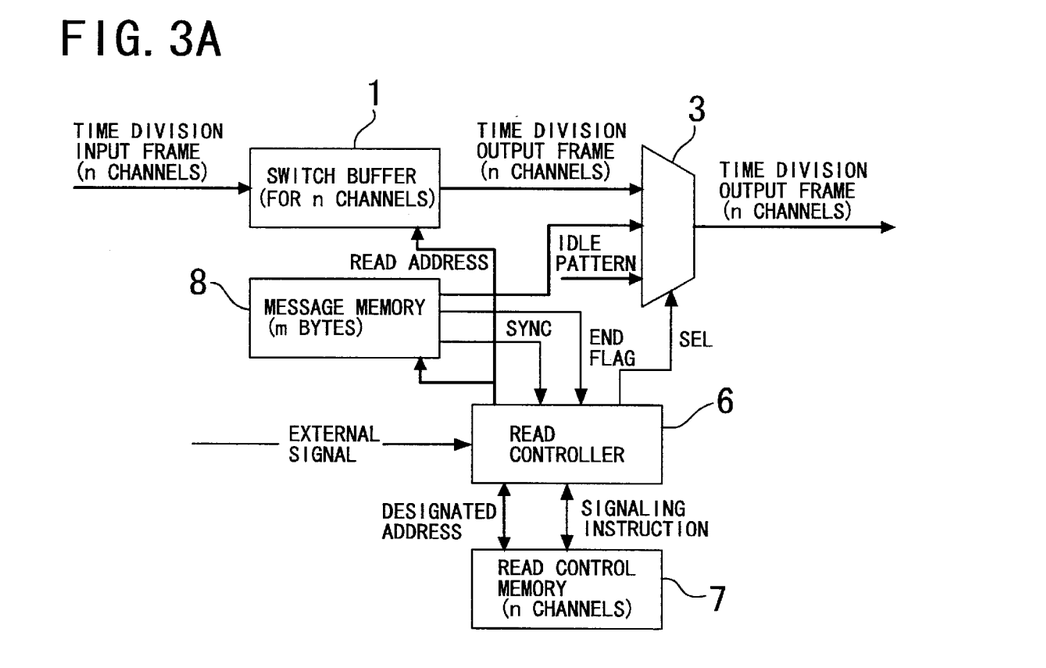
FIG. 3A is a block diagram showing a modification to the external signal synchronized message signaling apparatus for a time division channel system shown in FIG. 1A.
Figure 3B:
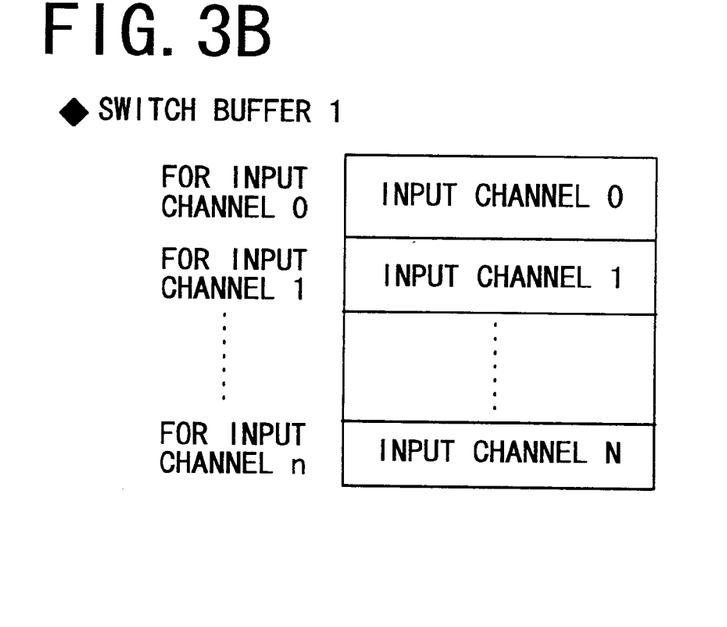
FIGS. 3B, 3C and 3D are diagrammatic views illustrating stored contents of a switch buffer, a message memory and a read control memory shown in FIG. 3A.

Referring now to FIG. 3A, there is shown a modification to the external signal synchronized message signaling apparatus for a time division channel system described hereinabove with reference to FIG. 1A. The modified external signal synchronized message signaling apparatus for a time division channel system is generally constructed such that, in order to make it possible to determine whether or not a message should be signaled in unit of a signaling message in response to an external signal, the SYNC bit which is a synchronous signaling instruction signal is recorded not into a read control memory but into a message memory. In particular, the modified message signaling apparatus is different from the message signaling apparatus of FIG. 1A in that it includes a read controller 6, a read control memory 7 and a message memory 8 in place of the read controller 5, read control memory 4 and message memory 2 of FIG. 1A, respectively.

Figure 3C:
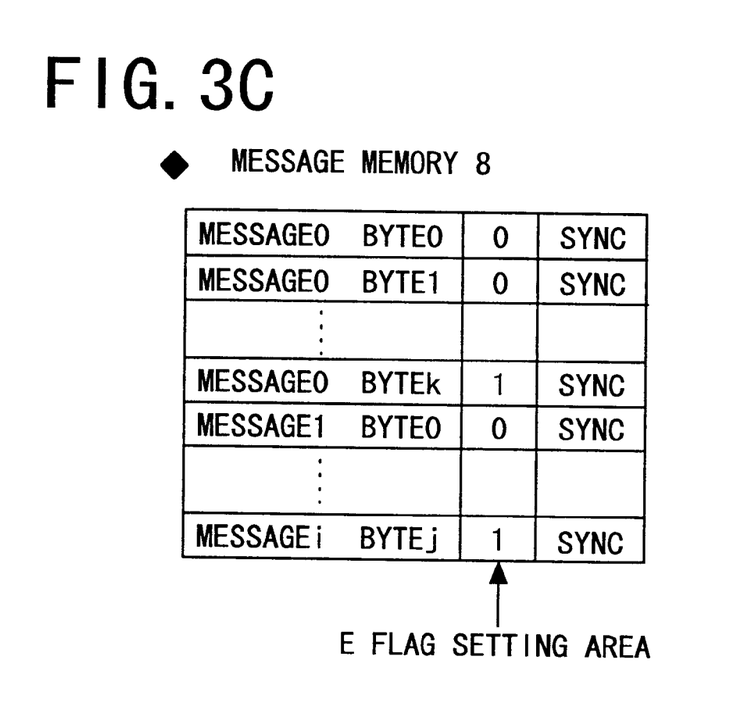
Figure 3D:
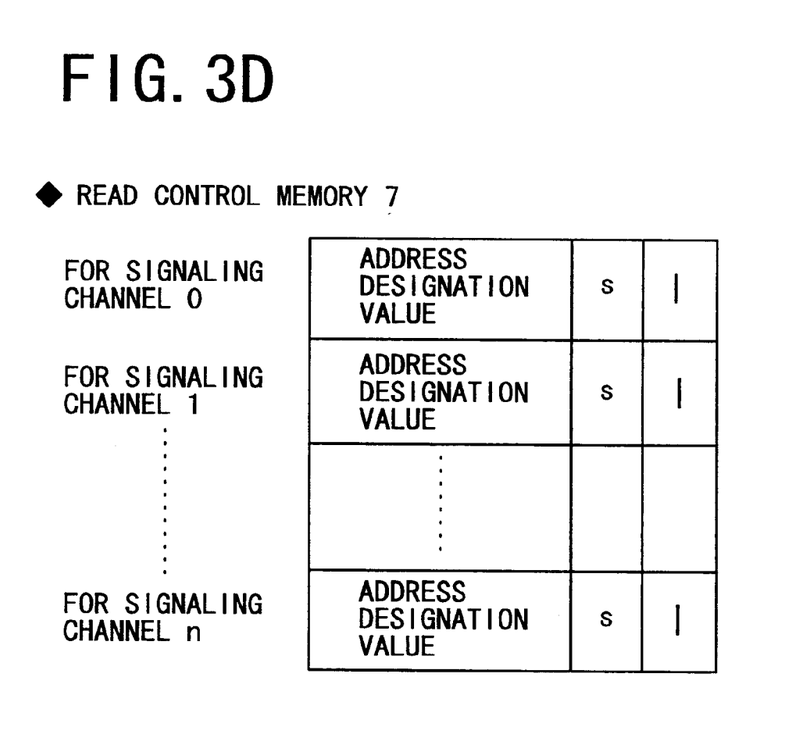

The message memory 8 is constructed such that, as seen in FIG. 3C, information of messages, the E flag and the SYNC bit is set therein so that, for each signaling message, it is determined based on the SYNC bit whether or not the message should be signaled in synchronism with an external signal. Meanwhile, the read control memory 7 is constructed such that, as seen in FIG. 3D, only the address designation value, S bit and I bit other than the setting location of the SYNC bit are set therein. With the modified message signaling apparatus, a message of the message memory 8 for which the SYNC bit is set is determined so as not to be signaled by the channels until the external input signal becomes active, and consequently, order transmission can be performed in synchronism with the external input signal.

Figure 4:
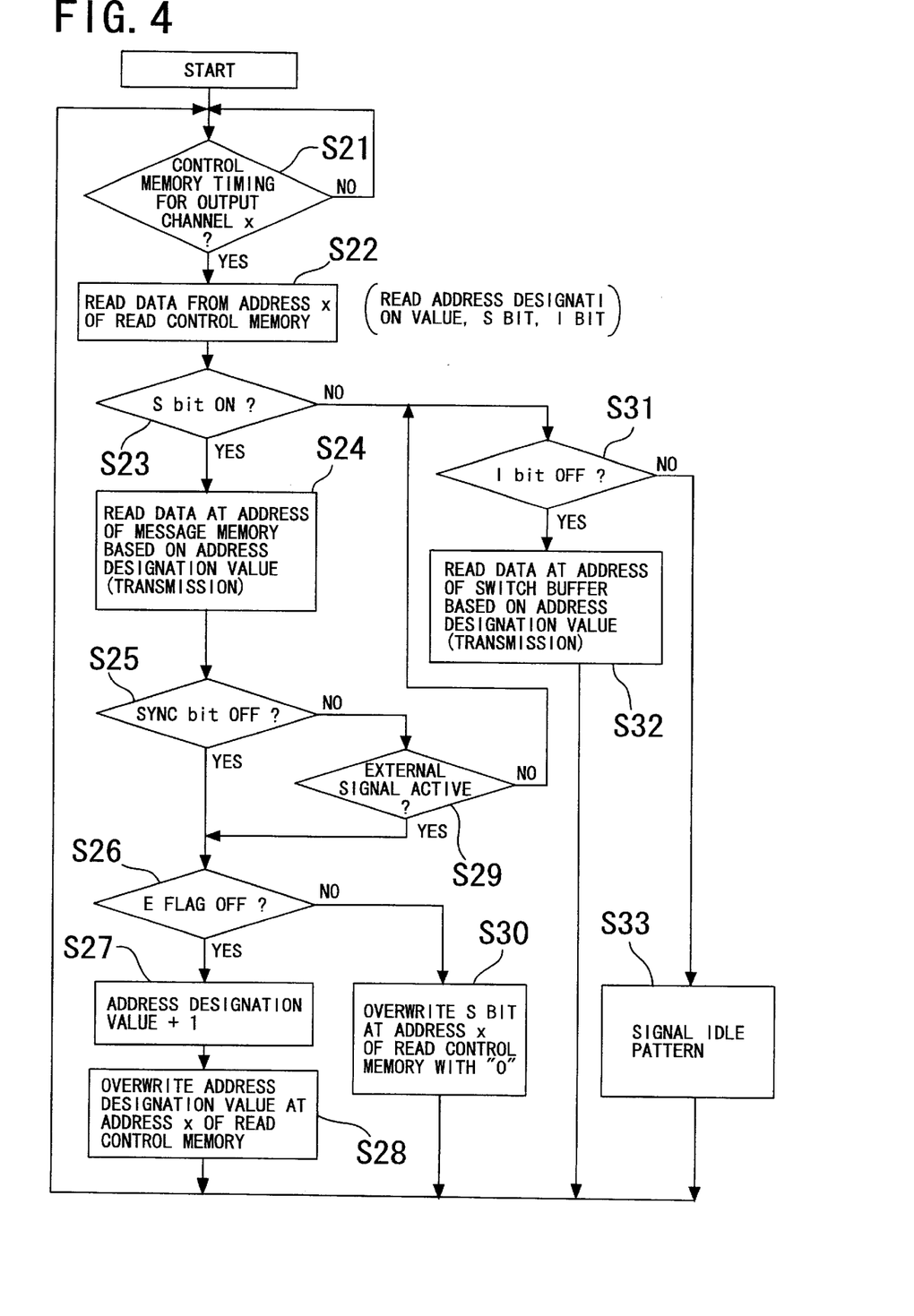
FIG. 4 is a flow chart illustrating operation of the external signal synchronized message signaling apparatus for a time division channel system shown in FIG. 3A.

FIG. 4 illustrates operation of the time division switch of the modified message signaling apparatus of FIG. 3A. Referring to FIGS. 3A to 3D and 4, if the read controller 6 detects, for example, a timing of an output channel x (step S21), then it reads out the address designation value, S bit and I bit at the address x of the read control memory 7 (step S22) and checks the S bit (step S23). If the S bit is "1" (yes in step S23), then the read controller 6 reads out message data, the E flag and the synchronization bit (SYNC bit) from the message memory 8 based on the read out address designation value (step S24) and checks the thus read out SYNC bit (step S25). If the SYNC bit is "0" (yes in step S25) and if the SYNC bit is not "0" (no in step S25) but the external signal is "1" (yes in step S29),then the read controller 6 checks the E flag (step S26). If the E flag is "0" (yes in step 826), since the message data is not the last data, the read controller 6 increments the address designation value by 1 (step S27) and overwrites the address designation value at the address x with the incremented address designation value (step S28). This is performed in order to make it possible, when the read controller 6 detects a timing of the output channel x subsequently, to read out a next address designation value from the read control memory 7 and read out next message data of the same message from the message memory 8 (steps S21 to S25). While similar operation is repeated for each of the output channels x to continue signaling of message data, if "1" is detected from the E flag (no in step S26), then the S bit at the address x of the read control memory 4 is overwritten with "0" in order to end the signaling of the message and subsequently perform processing of reading out of the switch buffer. 1 or signaling of the idle pattern (step S30).

If the S bit at the timing of the output channel x in step S23 is "0" (no in step S23) and if the external signal is "0" in step S29 (no in step S29), then the read controller 6 checks the I bit (step S31). If the I bit is "0" (yes in step S31), then the read controller 6 reads out data at the address of the switch buffer 1 (step S32). If the I bit is "0" (no in step S31), then the read controller 6 signals the idle pattern (step S33).

The operation described above is performed also at a timing of any other output timing. Since an address designation value which is a top address of a message to be signaled is stored in each signaling channel of the read control memory 4, reading out of message data is shared by the output channels, and message data are read out suitably from the message memory 8 and the read control memory 4 and the data read out and the idle patterns are switchably multiplexed in the signaling channels by the selector 3 to form a time division output frame. The thus formed time division output frame is outputted.

With the modified message signaling apparatus described above, since designation of synchronization is performed for each message, synchronization designation can be performed based on a significance of the message itself. Since synchronization designation need not be recognized upon setting of individual channels, signaling control can be simplified.

While a preferred embodiment of the present invention has been described using specific terms, such description is for illustrative purposes only, and it is to be understood that changes and variations may be made without departing from the spirit or scope of the following claims.

What is claimed is:

1. An external signal synchronized message signaling apparatus which inserts a message into predetermined channels to form a time division frame and transmits the time division frame in synchronism with an external signal, comprising:

a message memory having the message stored at predetermined addresses thereof;

a read control memory in which information of the addresses of said message memory at which the message is stored and external synchronization information indicative of whether the message should be signaled in synchronism with the external signal are stored in a coordinated relationship at storage positions thereof which corresponds to predetermined channel timings of a time division output frame; and a read controller for reading out, for each channel timing of the time division output frame, the address information and the external synchronization information at the corresponding storage position from said read control memory and, when the external signal is inputted at the channel timing and the external synchronization information indicates synchronized signaling, reading out the message from said message memory based on the address information and signaling the message to the time division output frame.

2. An external signal synchronized message signaling apparatus as claimed in claim 1, wherein said read control memory has stored therein, corresponding to the information of each of the stored addresses, idle information indicating whether or not an idle pattern should be outputted to the time division output frame, and said read control refers, when to read out the information of the address, to the idle information and signals, when the idle information indicates signaling of an idle pattern, a predetermined idle pattern to the time division output frame.

3. An external signal synchronized message signaling apparatus as claimed in claim 1, further comprising a switch buffer memory having channel data of individual channels of a time division input frame and operable to read out the channel data and signal the channel data to the time division output frame, and wherein said read control memory has stored therein, corresponding to the information of each of the addresses, channel information indicative of whether the channel data should be outputted to the time division output frame using the stored address information also as read address information for said switch buffer, and said read controller refers, upon reading of the information of the address, to the channel information, reads out, when the channel information indicates signaling of the channel data, the channel data from said switch buffer memory based on the read out address information and signals the read out channel data to the time division output frame.

4. An external signal synchronized message signaling apparatus as claimed in claim 1, wherein the message is divided in a plurality of data corresponding to different channels and stored at consecutive addresses of said message memory while information of the address of a top one of the divisional data is initially set as the address information in said read control memory, and said read controller successfully outputs the divisional data beginning with the top data to the time division output frame at the predetermined channel timings and overwrites, each time the data is outputted, the address information of said read control memory based on the successive address.

5. An external signal synchronized message signaling apparatus which inserts a message into predetermined channels to form a time division frame and transmits the time division frame in synchronism with an external signal, comprising:

a message memory in which the message and external synchronization information indicative of whether or not the message should be signaled in synchronism with the external signal are stored in a coordinated relationship at predetermined addresses thereof;

a read control memory in which information of the addresses of the message of said message memory is stored at storage positions thereof which corresponds to predetermined channel timings of a time division output frame; and a read controller for reading out, for each of the channel timings of the time division output frame, the address information from the storage position of said read control memory corresponding to the channel timing and reading out the message and the external synchronization information from said message memory based on the address information, and signaling, when the external synchronization information indicates synchronized signaling, the message to the time division output frame.

6. An external signal synchronized message signaling apparatus as claimed in claim 5, wherein said read control memory has stored therein, corresponding to the information of each of the stored addresses, idle information indicating whether or not an idle pattern should be outputted to the time division output frame, and said read control refers, when to read out the information of the address, to the idle information and signals, when the idle information indicates signaling of an idle pattern, a predetermined idle pattern to the time division output frame.

7. An external signal synchronized message signaling apparatus as claimed in claim 5, further comprising a switch buffer memory having channel data of individual channels of a time division input frame and operable to read out the channel data and signal the channel data to the time division output frame, and wherein said read control memory has stored therein, corresponding to the information of each of the addresses, channel information indicative of whether the channel data should be outputted to the time division output frame using the stored address information also as read address information for said switch buffer, and said read controller refers, upon reading of the information of the address, to the channel information, reads out, when the channel information indicates signaling of the channel data, the channel data from said switch buffer memory based on the read out address information and signals the read out channel data to the time division output frame.

8. An external signal synchronized message signaling apparatus as claimed in claim 5, wherein the message is divided in a plurality of data corresponding to different channels and stored at consecutive addresses of said message memory while information of the address of a top one of the divisional data is initially set as the address information in said read control memory, and said read controller successfully outputs the divisional data beginning with the top data to the time division output frame at the predetermined channel timings and overwrites, each time the data is outputted, the address information of said read control memory based on the successive address.

9. An external signal synchronized message signaling apparatus which inserts a message into predetermined channels to form a time division frame and transmits the time division frame in synchronism with an external signal, comprising:

a switch buffer for receiving a time division input frame as an input thereto and outputting a time division output frame in a sequential write-random read manner;

a message memory for outputting a message to a time division output frame;

a read control memory in which addresses for reading out data of said switch buffer and said message memory and outputting the data to channels of the time division output frame are stored;

the addresses being used commonly for said switch buffer and said message memory;

designation information which designates from which one of said switch buffer and said message memory data should be read out so as to be signaled into the time division output frame being stored in said read control memory or said message memory in a coordinated relationship to each of the addresses; and a read controller for referring, when data to be signaled to a channel of the time division output frame is to be outputted based on one of the addresses of said read control memory, to the designation information to read out the data of said switch buffer or said message memory and signaling the data in response to an external signal.

10. An external signal synchronized message signaling apparatus as claimed in claim 9, wherein said read controller calculates, each time data is read out, a next read address and overwrites the address of a channel of the time division output frame of said read control memory with the calculated next read address.

* * * * *